3,267,423
ELECTROMECHANICAL VIBRATORS

Julien M. Loeb, Saint-Cloud, France, assignor of fifty percent each to Compagnie Generale de Geophysique, Paris, France, and L'Institut Francais du Petrole, des Carburants et Lubrifiants, Rueil-Malmaison (Seine et Oise), France
Filed May 1, 1963, Ser. No. 277,337
Claims priority, application France, May 8, 1962, 896,771
3 Claims. (Cl. 340—17)

The present invention relates to electromechanical vibrators adapted to generate seismic vibrations intended to be used chiefly, but not exclusively for the purposes of seismic investigation.

It is a well-known fact that electromechanical vibration generators of a conventional type are not suitable for producing seismic vibrations with a high yield. This inconvenience results from the fact that said vibration generators have high impedances, whereas the ground to which they are to apply such vibrations behaves in the manner of a receiver of a low internal impedance, so that the efficiency of the generators is poor.

In other words, it is an easy matter to produce an electromechanical vibrator having a movable member which vibrates at a desired frequency with a comparatively large amplitude when it is not loaded; however, the amplitudes applied to the ground are very small since for obtaining a substantial movement of the ground, it is necessary to exert a very considerable force.

There has already been proposed means for improving the efficiency of force transferral by resorting to the combination of the two following features: using resonance phenomena; using an arrangement equivalent to a transformer with a view toward improving the matching.

The present invention has as an object the provision of a novel transformer which does not necessarily imply the use of resonance phenomena, said transformer being adapted to improve substantially the aforesaid efficiency due solely to its own action.

According to the invention, a generator of electromechanical vibrations is contemplated, the movable member of which is constituted by a movable coil adapted to move vertically inside a gap in the manner of the coil of an electrodynamic loudspeaker; the magnetic circuit producing the magnetic field is rigidly connected with a mass forming the equivalent of a stationary point for the production of seismic vibrations; the static force exerted by gravity on the system, including the mass and the magnetic circuit secured thereto, is balanced by a spring which allows substantial movement of the coil with reference to said suspended system including the mass and the magnetic circuit. A pedestal is provided which rests on the ground and carries the mass through the agency of said spring.

According to further features of the invention, an amplitude transformer is inserted between the movable winding and the pedestal and is constituted by a lever having two ends which are connected respectively with the pedestal and the movable coil, while an intermediate point of its length is secured to the suspended system including the mass and the magnetic circuit. It is sometimes preferable to resort to several levers of this type arranged radially to provide a balanced arrangement.

According to a further feature of the invention, the three pivotal connections for each lever are constituted by yielding blades cutting out all clearances. Such an embodiment is necessary for the transmission of the very small angular movements to be considered, which small angular movements also make such an embodiment possible.

The invention will now be described more completely together with other advantages and features, as will appear from the following description, reference being made to the accompanying drawings wherein.

Figure 1:
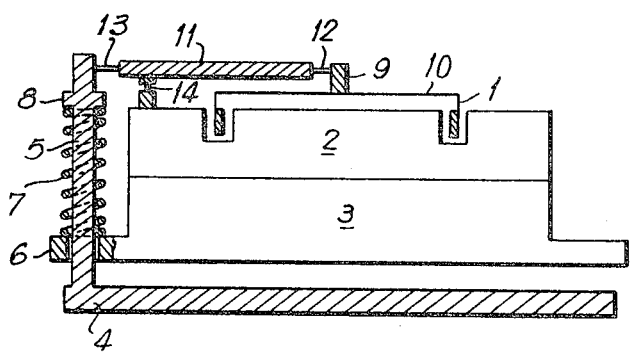
FIG. 1 is a general view of a generator according to the invention.
Figure 2:
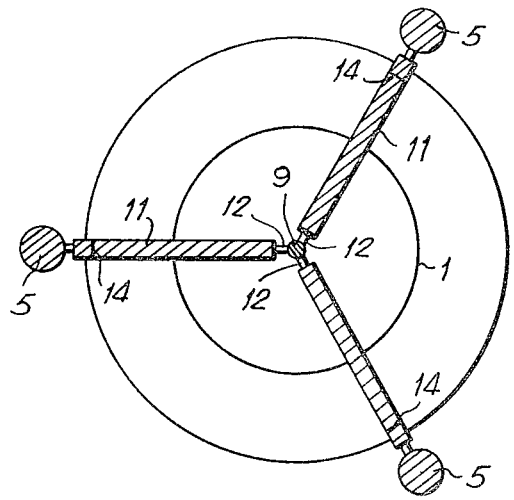
FIG. 2 is a view of said generator from above.

The illustrated vibration generator is, of course, described by way of an example of a preferred embodiment and by no means in a limiting sense.

As illustrated, the generator is constituted chiefly by an electrodynamic system including an annular movable coil 1 housed inside an annular gap in the magnetic core or body 2. Such body can be formed for example, of any material suitable of constituting a circuit for magnetic flux as, for instance, in cores in loudspeakers.

A mass 3 is rigidly secured to the magnetic body to form a stationary point which allows producing vibrations in the ground said mass may be any body of suitable weight.

The operation of the system 1–2 including the coil and the magnetic body is well-known per se, since it is the same as that of an electrodynamic loudspeaker. It is therefore not necessary to describe it with any further detail.

The pedestal of the apparatus includes a base 4 carrying small uprights 5, while the actual base 4 rests on the ground.

The system 2–3 including the magnetic body and the mass is suspended by means of tractionally stressed springs 7 the upper ends of which are secured to the uprights 5, while their lower ends are secured to the mass 3 including, to this end, an annular peripheral flange 6 provided with openings through which the uprights are adapted to pass.

The upper end of each spring 7 is secured to a collar 8 formed on the upright 5.

To the movable coil 1, a vertical spindle 9 is secured through the agency of a disc 10.

According to the invention, the amplitudes of the comparatively large movements of the winding 1 with reference to the magnetic body 2 are reduced by the levers 11 arranged radially over the magnetic body. The inner ends of the levers 11 are connected to the spindle 9, while their outer ends are connected with the upper ends of the corresponding uprights 5. An intermediate point of each lever is secured to the system 2–3 including the magnetic circuit and the mass.

To this end the inner end of each lever 11 is connected with the spindle 9 by means of a yielding blade 12 having ends fitted respectively inside the lever 11 and the spindle 9. A similar connection is provided between the outer end of each lever and the cooperating upright 5 through the agency of a yielding blade 13.

Lastly, a third yielding blade 14 arranged vertically is fitted between two projections secured respectively to the lever and to the magnetic body.

The system behaves as if the levers 11 were pivotally secured at 14 to the magnetic circuit 2, while their ends are pivotally secured respectively to the spindle 9 and to the uprights 5.

Consequently, the movements of the movable winding with reference to the system 2–3 are transformed into shorter movements of the system 2–3 with reference to the pedestal 4, the coefficient of reduction being equal to the ratio $a/b$ between the lever arms, $a$ being the distance between the blade 14 and the inner edge of the upright 5 and $b$ the distance between said blade 14 and the outer edge of the spindle 9.

In contradistinction, the forces exerted on the pedestal are multiplied by the ratio $b/a$ which may be equal to 10 or even to a higher figure.

It will be noted that, when inoperative, the yielding blades 12, 13, 14 have practically no force to transmit, the sole part to be played by said blades consisting of carrying the movable coil.

On the other hand, experience shows that it is an easy matter to give the blades a size such that they may transmit readily the stresses produced by the vibrations of the movable coil.

Of course, nothing prevents the use in the embodiment disclosed of resonance phenomena with a view toward increasing the stresses exerted on the ground and it is sufficient to select for this purpose a suitable flexibility coefficient for the springs and a suitable value for the mass of the system 2–3.

Preferably, one spring 7 is provided for each upright without this limiting the invention.

Obviously, many modifications may be effected in the embodiment described without departing from the scope of the invention as defined in the accompanying claims. For example, the centering of the movable coil may be ensured in any desired manner. Also, the system 2–3 may be held by springs operating through compression.

What is claimed is:

1. An electromechanical vibration generator adapted to rest on the ground and comprising a magnetic body, a movable coil operatively associated with said body and adapted to be vibrated by reaction to magnetic flux in said body, an amplitude transformer adapted for being located between said movable coil and the ground, said transformer being constituted by a lever system, including at least one lever, a pedestal adapted for resting on the ground, said lever having ends pivotally secured respectively to the pedestal and to the movable coil, means floatingly suspending said magnetic body above the ground, and means connecting the lever, at a position intermediate the ends of the lever and closer to the end connected to the pedestal than to the end connected to the coil, pivotally to the floatingly suspended magnetic body.

2. A generator as claimed in claim 1, wherein the means suspending said magnetic body includes, for each lever, an upright rigid with the pedestal and a spring operatively connected between said upright and said body, said lever being pivotally connected to said upright.

3. A generator as claimed in claim 1, comprising yielding blade sections connecting each said lever to the coil, pedestal and body.

No references cited.

BENJAMIN A. BORCHELT, *Primary Examiner.*

P. A. SHANLEY, *Assistant Examiner.*